(12) United States Patent
Schmiegel

(10) Patent No.: US 6,429,271 B1
(45) Date of Patent: Aug. 6, 2002

(54) FLUOROELASTOMER COMPOSITION HAVING EXCELLENT PROCESSABILITY AND LOW TEMPERATURE PROPERTIES

(75) Inventor: Walter Werner Schmiegel, Wilmington, DE (US)

(73) Assignee: DuPont Dow Elastomers, L.L.C., Wilmington, DE (US)

(*) Notice: Subject to any disclaimer, the term of this patent is extended or adjusted under 35 U.S.C. 154(b) by 0 days.

(21) Appl. No.: 09/956,681

(22) Filed: Sep. 20, 2001

Related U.S. Application Data

(62) Division of application No. 09/378,365, filed on Aug. 20, 1999, now Pat. No. 6,329,469.
(60) Provisional application No. 60/097,387, filed on Aug. 21, 1998.

(51) Int. Cl.[7] ............................................... C08F 114/18
(52) U.S. Cl. ........................ 526/255; 525/248; 525/250; 525/264; 526/247; 526/253
(58) Field of Search ................. 525/248, 250, 525/264; 526/247, 253, 255

(56) References Cited

U.S. PATENT DOCUMENTS

| | | |
|---|---|---|
| 3,331,822 A | 7/1967 | Kometani et al. |
| 3,331,823 A | 7/1967 | Sianesi et al. |
| 3,851,018 A | 11/1974 | Kelly |
| 4,243,770 A | 1/1981 | Tatemoto et al. |
| 4,250,278 A | 2/1981 | Suzuki et al. |
| 4,259,463 A | 3/1981 | Moggi et al. |
| 4,361,678 A | 11/1982 | Tatemoto et al. |
| 4,489,196 A | 12/1984 | Schmiegel |
| 4,882,390 A | 11/1989 | Grootaert et al. |
| 4,912,171 A | 3/1990 | Grootaert et al. |
| 4,957,975 A | 9/1990 | Carlson et al. |
| 5,214,106 A | 5/1993 | Carlson et al. |
| 5,225,504 A * | 7/1993 | Tatsu et al. .................. 526/206 |
| 5,260,393 A | 11/1993 | Arcella et al. |
| 5,478,902 A | 12/1995 | Yamamoto et al. |
| 5,591,804 A | 1/1997 | Coggio et al. |
| 5,648,429 A | 7/1997 | Chiodini et al. |
| 5,696,216 A | 12/1997 | Kruger et al. |
| 5,719,245 A | 2/1998 | Yamamoto et al. |
| 5,874,506 A | 2/1999 | Tatsu et al. |
| 5,969,066 A * | 10/1999 | Enokida et al. ............. 526/247 |
| 6,011,129 A * | 1/2000 | Saito et al. .................. 526/247 |

FOREIGN PATENT DOCUMENTS

| | | |
|---|---|---|
| EP | 0041737 | 12/1981 |
| GB | 1496084 | 12/1977 |

OTHER PUBLICATIONS

W. W. Schmiegel, Crosslinking of Elastomeric Vinylidene Fluoride Copolymers with Nucleophiles, Angewandte Makromolekware Chemie, 76/77, 39–65, 1979.

* cited by examiner

Primary Examiner—Helen L. Pezzuto

(57) ABSTRACT

Copolymers having copolymerized units of vinylidene fluoride, perfluoro(alkyl vinyl) ether, 2-hydropentafluoropropene, and, optionally, tetrafluoroethylene, exhibit excellent low temperature properties and processability when cured with polyhydroxy compounds or amines.

7 Claims, No Drawings

FLUOROELASTOMER COMPOSITION HAVING EXCELLENT PROCESSABILITY AND LOW TEMPERATURE PROPERTIES

CROSS REFERENCE TO RELATED APPLICATION

This is a division of application Ser. No. 09/378,365, filed Aug. 20, 1999 now U.S. Pat. No. 6,329,469.

This application claims the benefit of U.S. Provisional Application No. 60/097,387 filed Aug. 21, 1998.

FIELD OF THE INVENTION

This invention relates to fluoroelastomers that are capable of being crosslinked with polyhydroxy compounds to produce cured compositions having excellent processability and low temperature properties.

BACKGROUND OF THE INVENTION

Elastomeric fluoropolymers (i.e. fluoroelastomers) exhibit excellent resistance to the effects of heat, weather, oil, solvents and chemicals. Such materials are commercially available and are most commonly either dipolymers of vinylidene fluoride ($VF_2$) with hexafluoropropylene (HFP) or terpolymers of $VF_2$, HFP, and tetrafluoroethylene (TFE). While these di- and terpolymers have many desirable properties, including low compression set and excellent processability, their low temperature flexibility is not adequate for all applications.

It is known that incorporation of perfluorinated ether monomer units into vinylidene fluoride elastomers improves low temperature properties. For example, Carlson, in U.S. Pat. No. 5,214,106 discloses that when perfluoro(methyl vinyl) ether (PMVE) is substituted for HFP, the resultant $VF_2$/PMVE/TFE copolymers have glass transition temperature ($T_g$) values which are 10°–20° C. lower than those of the corresponding $VF_2$/HFP/TFE copolymers. $T_g$ is often used as an indicator of low temperature flexibility because polymers having low glass transition temperatures maintain elastomeric properties at low temperatures.

Kruger, in U.S. Pat. No. 5,696,216, discloses PMVE-containing fluoroelastomers that are similar to those disclosed by Carlson. Those disclosed by Kruger contain copolymerized units of $VF_2$; at least one fluorinated propene and or fluorinated methyl vinyl ether; TFE; at least one perfluoro(polyoxyalkyl vinyl) ether, and a crosslinking site.

The compositions of Carlson and Kruger are most effectively crosslinked through use of peroxide cure systems. However, when compression molding equipment is used with peroxide curable $VF_2$/PMVE copolymers the compositions generally exhibit a tendency to stick to and foul the mold.

Tetrapolymers of $VF_2$, HFP, TFE and perfluoro(alkyl vinyl) ethers (PAVE) other than PMVE are also known to exhibit improved low temperature properties compared to terpolymers of $VF_2$, HFP and TFE. For example, Arcella, et al. in U.S. Pat. No. 5,260,393 disclose a tetrapolymer comprising copolymerized units of 48–65 wt. % $VF_2$, 21–36 wt. % HFP, 3–9 wt. % PAVE, and 0–17 wt. % TFE. The compositions can be cured using a bisphenol curing system and do not exhibit the mold fouling problems associated with peroxide cures of $VF_2$/PMVE copolymers. Similarly, British Patent 1,296,084 discloses fluoroelastomeric tetrapolymers containing copolymerized units of 48–65 wt. % $VF_2$, 8–23 wt. % HFP, 4–15 wt. % TFE, and 17–30 wt. % PAVE. Such compositions have good low temperature properties and are curable with bisphenols or amines. Although these tetrapolymers exhibit good low temperature properties, many applications require improved low temperature and processability performance.

Merely raising the PAVE content while lowering the HFP content is not a solution to the problem of improving low temperature performance of $VF_2$/HFP/PAVE/TFE terpolymers. This is because polymers wherein the level of HFP is below about 8–10 mole percent do not contain sufficient copolymerized monomer sequences consisting of HFP units flanked by $VF_2$ units to permit efficient crosslinking with bisphenols. As is well known in the art, efficient curing of $VF_2$/HFP-containing fluoroelastomers with a bisphenol/ accelerator system is possible only when a —$CH_2$— group in the polymer backbone is flanked by two perfluorinated carbons (e.g. $CF_2CF(CF_3)CH_2CF_2CF_2$), rendering the hydrogens acidic enough to be abstracted by base. The dehydrofluorinated polymers are easily crosslinked by bisphenols. Furthermore, as discussed by W. W. Schmiegel, in *Angewandte Makromolekylare Chemie*, 76/77, 39 (1979), completely eliminating HFP to form $VF_2$/TFE/PMVE terpolymers results in formation of monomer sequences consisting of TFE/$VF_2$/TFE; TFE/$VF_2$/PMVE; PMVE/$VF_2$/PMVE; and PMVE/$VF_2$/TFE. Although such sites readily undergo elimination of HF or $HOCF_3$ in the presence of base, the double bonds thus formed are not easily crosslinked by bisphenols or any other traditional crosslinking agents.

There thus exists an unfulfilled need in the art for a method of providing copolymers of $VF_2$, TFE, and PAVE that maintain optimum low temperature properties, but which exhibit low mold sticking characteristics, improved processability and are easily curable.

SUMMARY OF THE INVENTION

The present invention is directed to a fluoroelastomer consisting essentially of copolymerized units of 23–65 weight percent vinylidene fluoride, 25–75 weight percent perfluoro(alkyl vinyl) ether, 0–30 weight percent tetrafluoroethylene, and 0.3–5 weight percent 2-hydropentafluoropropene.

In addition, the invention is directed to a curable composition comprising

A. a fluoroelastomer consisting essentially of copolymerized units of 23–65 weight percent vinylidene fluoride, 25–75 weight percent perfluoro(alkyl vinyl) ether, 0–30 weight percent tetrafluoroethylene, and 0.3–5 weight percent 2-hydropentafluoropropene;

B. a polyhydroxy crosslinking agent;

C. a cure accelerator; and

D. a metal oxide or metal hydroxide.

A preferred embodiment of the curable compositions of the invention additionally comprises a modified silane coated mineral filler.

A further preferred embodiment of the curable compositions of the invention additionally comprises a molecular sieve.

DETAILED DESCRIPTION OF THE INVENTION

The polymers of the present invention include both uncured (raw) and cured fluorinated copolymers. The copolymers are capable of undergoing crosslinking reactions with polyhydroxylic compounds to form elastomeric compositions that exhibit unusually good low temperature properties.

The polymer backbones of the copolymers consist essentially of copolymerized units of $VF_2$, PAVE, 2-hydropentafluoropropene (i.e. 1,1,3,3,3-pentafluoropropene), referred to herein as HPFP, and, optionally, TFE. That is, each of the first three monomers (and optionally TFE) must be present in the polymer chain, but higher order polymers, i.e. those containing other additional monomer units, the addition of which does not affect the basic and novel characteristics of the polymer, are also within the scope of the present invention. For example, the tetrapolymer $VF_2$/PAVE/TFE/HPFP can contain other copolymerized vinyl or olefin monomers such as vinyl fluoride, trifluoroethylene, trifluoropropene, chlorotrifluoroethylene, alkyl vinyl ether, vinyl acetate, vinyl chloride, ethylene, and propylene, generally in quantities of up to about 5 wt. %. In addition, the fluoroelastomer copolymers of this invention may contain up to about 1 wt. % iodine bound to polymer chain ends, the iodine being introduced via use of an iodine-containing chain transfer agent during polymerization.

The fluoroelastomers of the invention contain between 23–65 wt. % copolymerized vinylidene fluoride units, preferably between 33–55 wt. % of such units. If less than 23 wt. % vinylidene fluoride units are present, the polymerization rate is very slow. In addition, good low temperature flexibility cannot be achieved. Vinylidene fluoride levels above 65 wt. % result in polymers that contain crystalline domains and are characterized by poor low temperature compression set resistance and reduced fluids resistance.

Perfluoro(alkyl vinyl) ethers (PAVE) suitable for use as comonomers include those of the formula $$CF_2=CFO(R_fO)_n(R_{f'}O)_mR_f \qquad (I)$$

where $R_f$ and $R_{f'}$ are different linear or branched perfluoroalkylene groups of 2–6 carbon atoms, m and n are independently 0–10, and $R_f$ is a perfluoroalkyl group of 1–6 carbon atoms.

A preferred class of perfluoro(alkyl vinyl) ethers includes compositions of the formula $$CF_2=CFO(CF_2CFXO)_nR_f \qquad (II)$$

where X is F or $CF_3$, n is 0–5, and $R_f$ is a perfluoroalkyl group of 1–6 carbon atoms.

A most preferred class of perfluoro(alkyl vinyl) ethers includes those ethers wherein n is 0 or 1 and $R_f$ contains 1–3 carbon atoms. Examples of such perfluorinated ethers include perfluoro(methyl vinyl) ether and perfluoro(propyl vinyl) ether. Other useful monomers include compounds of the formula $$CF_2=CFO[(CF_2)_mCF_2CFZO]_nR_f \qquad (III)$$

where $R_f$ is a perfluoroalkyl group having 1–6 carbon atoms, m=0 or 1, n=0–5, and Z=F or $CF_3$.

Preferred members of this class are those in which $R_f$ is $C_3F_7$, m=0, and n=1.

Additional perfluoro(alkyl vinyl) ether monomers include compounds of the formula $$CF_2=CFO[(CF_2CFCF_3O)_n(CF_2CF_2CF_2O)_m(CF_2)_p]C_xF_{2x+1} \qquad (IV)$$

where m and n independently=1–10, p=0–3, and x=1–5. Preferred members of this class include compounds where n=0–1, m=0–1, and x=1.

Examples of useful perfluoro(alkoxy vinyl) ethers include $$CF_2=CFOCF_2CF(CF_3)O(CF_2O)_mC_nF_{2n+1} \qquad (V)$$

where n=1–5, m=1–3, and where, preferably, n=1.

Mixtures of perfluoro(alkyl vinyl) ethers and perfluoro(alkoxy vinyl) ethers may also be used.

The perfluoro(alkyl vinyl) ether content of the fluoroelastomers of the invention ranges from 25–75 wt. %. If perfluoro(methyl vinyl) ether is used, then the fluoroelastomer preferably contains between 30–44 wt. % copolymerized perfluoroether units. If less than 25 wt. % perfluoro(alkyl vinyl) ether is present, the low temperature properties of the fluoroelastomers are adversely affected.

Copolymerized units of tetrafluoroethylene may also be present in the fluoroelastomers of the invention at levels up to 30 wt. %. The presence of copolymerized units of TFE is desirable for the purpose of increasing fluorine content without unduly compromising low temperature flexibility. High fluorine content promotes good fluid resistance. If TFE is present as a comonomer, it is preferably copolymerized in amounts of at least 3 wt. %. Levels of 3 wt. % or greater TFE lead to improved fluid resistance in some end use applications. TFE levels above 30 wt. % result in some polymer crystallinity which affects low temperature compression set and flexibility.

The fourth copolymerized monomer unit in the polymers of the invention is 2-hydropentafluoropropene (HPFP). A particular characteristic of the HPFP monomer is that it acts as an independent cure site monomer that takes part in crosslinking reactions with polyhydroxylic curing agents. Polymers that contain copolymerized HPFP monomer units do not require the presence of copolymerized monomer sequences of $VF_2$ flanked by perfluoromonomers (e.g. HFP/$VF_2$/HFP) for initiation of dehydrofluorination. Introduction of copolymerized HPFP units into the $VF_2$/HFP copolymer chain creates sites that exceed the reactivity of HFP/$VF_2$/HFP sequences. HFP is a perfluorinated monomer and thus contains no hydrogens. It cannot function as an independent cure site monomer because it is incapable of undergoing dehydrofluorination. In fact, HFP-containing $VF_2$ copolymers of PMVE must contain at least about 8–10 wt. % HFP in order to provide a sufficient concentration of $—CF_2CF(CF_3)CH_2CF_2CF_2—$ sequences for effective cure by polyhydroxylic compounds.

HPFP/TFE/PMVE terpolymers are disclosed in U.S. Pat. Nos. 5,478,902 and 5,719,245. In addition, HPFP/TFE/PMVE tetrapolymers containing not more than about 20 mole percent of an additional monomer are disclosed therein. Compositions containing high levels of $VF_2$ comonomer are not disclosed. In addition, U.S. Pat. No. 5,874,506 discloses $VF_2$/TFE/HFP/HPFP tetrapolymers. The polymers must contain 16–30 mol % HFP. Pentapolymers containing up to 5 mol % of additional comonomers are also disclosed therein. The tetrapolymers and pentapolymers disclosed in this reference do not exhibit good low temperature properties and have very different fluids resistance from the polymers of the present invention.

Because of the ease of hydrogen abstraction in HPFP-containing $VF_2$ fluoroelastomers, the polymers of the present invention require only low levels of HPFP, i.e. 0.3–5 wt. %, to promote efficient polyhydroxylic cures. This permits adjustment of other comonomer levels to maximize particular physical properties. Thus, the polymers of the present invention exhibit excellent cure characteristics with only low levels of HPFP. They maintain the high temperature compression set resistance properties and excellent cure response characteristic of polymers having significant amounts of copolymerized $VF_2$. Further, they exhibit a combination of excellent low temperature properties and processability not found in prior art fluoroelastomers. Preferably levels of HPFP will be between 0.7 and 3.0 wt. %.

The polymers of this invention may be prepared using free radical batch or semi-batch, or continuous free radical emulsion polymerization processes. They may also be prepared by free radical suspension polymerization processes.

For example, if a continuous emulsion process is utilized, the polymers are generally prepared in a continuous stirred tank reactor. Polymerization temperatures may be in the range of 40° to 145° C., preferably 100° to 135° C. at pressures of 2 to 8 MPa. Residence times of 20 to 60 minutes are preferred. Free radical generation may be effected through use of a water-soluble initiator such as ammonium persulfate, either by thermal decomposition or by reaction with a reducing agent such as sodium sulfite. An inert surface-active agent such as ammonium perfluorooctanoate may be utilized to stabilize the dispersion, usually in conjunction with addition of a base such as sodium hydroxide or a buffer such as disodium phosphate to control pH in the range 3 to 7. Unreacted monomer is removed from the reactor effluent latex by vaporization at reduced pressure. Polymer is recovered from the stripped latex by coagulation. For example, coagulation may be effected by reducing latex pH to about 3 by addition of acid, then adding a salt solution, such as an aqueous solution of calcium nitrate, magnesium sulfate, or potassium aluminum sulfate, to the acidified latex. The polymer is separated from the serum, then washed with water and subsequently dried. After drying, the product may be cured.

Chain transfer agents may be used in the polymerization in order to control the molecular weight distribution of the resulting polymers. Examples of chain transfer agents include isopropanol; methyl ethyl ketone; ethyl acetate; diethyl malonate; isopentane; 1,3-diiodoperfluoropropane; 1,4-diiodoperfluorobutane; 1,6-diiodoperfluorohexane; 1,8-diiodoperfluorooctane; methylene iodide; trifluoromethyl iodide; perfluoro(isopropyl) iodide; and perfluoro(n-heptyl) iodide. Polymerization in the presence of iodine-containing chain transfer agents may result in a polymer with one or two iodine atoms per fluoroelastomer polymer chain, bound at the chain ends (see for example U.S. Pat. No. 4,243,770 and U.S. Pat. No. 4,361,678). Such polymers may have improved flow and processability compared to polymers made in the absence of a chain transfer agent. Generally, up to about 1 weight percent iodine chemically bound to fluoroelastomer chain ends will be incorporated into the polymer, preferably from 0.1–0.3 wt. %.

Another embodiment of the present invention is a curable composition that comprises the above-described copolymers and a polyhydroxylic curing agent. The polymers of the invention are also curable with amines and amine derivatives, for example carbamates.

Any of the known polyhydroxylic aromatic crosslinking agents that require accelerators for satisfactory cure rates are suitable for use with the fluoroelastomers of the present invention. The crosslinking agent is usually added in amounts of from about 0.5–4 parts by weight per hundred parts by weight fluoroelastomer (phr), usually 1–2.5 phr. Preferred crosslinking agents are di- tri-, tetrahydroxybenzenes, naphthalenes, anthracenes and bisphenols of the formula

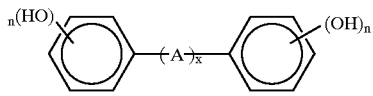

where A is a stable divalent radical, such as a difunctional aliphatic, cycloaliphatic, or aromatic radical of 1–13 carbon atoms, or a thio, oxy, carbonyl, sulfinyl, or sulfonyl radical; A is optionally substituted with at least one chlorine or fluorine atom; x is 0 or 1; n is 1 or 2 and any aromatic ring of the polyhydroxylic compound is optionally substituted with at least one atom of chlorine, fluorine, or bromine, a —CHO group, or a carboxyl or acyl radical (e.g. a —COR where R is OH or a $C_1$–$C_8$ alkyl, aryl, or cycloalkyl group). It will be understood from the above formula describing bisphenols that the —OH groups can be attached in any position (other than number one) in either ring. Blends of two or more such compounds can also be used.

Referring to the bisphenol formula shown in the previous paragraph, when A is alkylene, it can be, for example, methylene, ethylene, chloroethylene, fluoroethylene, difluoroethylene, 1,3-propylene, 1,2-propylene, tetramethylene, chlorotetramethylene, fluorotetramethylene, trifluorotetramethylene, 2-methyl -1,3-propylene, 2-methyl-1,2-propylene, pentamethylene, and hexamethylene. When A is alkylidene, it can be for example ethylidene, dichloroethylidene, difluoroethylidene, propylidene, isopropylidene, trifluoroisopropylidene, hexafluoroisopropylidene, butylidene, heptachlorobutylidene, heptafluorobutylidene, pentylidene, hexylidene, and 1,1-cyclohexylidene. When A is a cycloalkylene radical, it can be for example 1,4-cyclohexylene, 2-chloro-1,4-cyclohexylene, 2-fluoro-1,4-cyclohexylene, 1,3-cyclohexylene, cyclopentylene, chlorocyclopentylene, fluorocyclopentylene, and cycloheptylene. Further, A can be an arylene radical such as m-phenylene, p-phenylene, 2-chloro-1,4-phenylene, 2-fluoro-1,4-phenylene, o-phenylene, methylphenylene, dimethylphenylene, trimethylphenylene, tetramethylphenylene, 1,4-naphthylene, 3-fluoro-1,4-naphthylene, 5-chloro-1,4-naphthylene, 1,5-naphthylene, and 2,6-naphthylene.

Other useful crosslinking agents include hydroquinone, dihydroxybenzenes such as catechol, resorcinol, 2-methyl resorcinol, 5-methyl resorcinol, 2-methyl hydroquinone, 2,5-dimethyl hydroquinone; 2-t-butyl hydroquinone; and 1,5-dihydroxynaphthalene.

Additional polyhydroxy curing agents include alkali metal salts of bisphenol anions, quaternary ammonium salts of bisphenol anions and quaternary phosphonium salts of bisphenol anions. For example, the salts of bisphenol A and bisphenol AF. Specific examples include the disodium salt of bisphenol AF, the dipotassilum salt of bisphenol AF, the monosodium monopotassium salt of bisphenol AF and the benzyltriphenylphosphonium salt of bisphenol AF. Quaternary ammonium and phosphonium salts of bisphenol anions and their preparation are discussed in U.S. Pat. Nos. 4,957, 975 and 5,648,429.

In addition, derivatized polyhydroxy compounds, such as diesters, are useful crosslinking agents. Examples of such compositions include diesters of phenols, such as the diacetate of bisphenol AF, the diacetate of sulfonyl diphenol, and the diacetate of hydroquinone.

When cured with polyhydroxy compounds, the curable compositions will also generally include a cure accelerator. The most useful accelerators are quaternary phosphonium salts, quaternary alkylammonium salts, or tertiary sulfonium salts. Particularly preferred accelerators are n-tetrabutylammonium hydrogen sulfate, tributylallylphosphonium chloride and benzyltriphenylphosphonium chloride. Other useful accelerators include those described in U.S. Pat. Nos. 5,591,804; 4,912,171; 4,882,390; 4,259,463 and 4,250,278 such as tributylbenzylammonium chloride, tetrabutylammonium bromide, tetrabutylammonium chloride, benzyl tris(dimethylamino)phosphonium chloride; 8-benzyl-1,8-diazabicyclo[5,4,0]-7-undecenonium chloride, $[(C_6H_5)_2S^+(C_6H_{13})][Cl]^-$, and $[(C_6H_{13})_2S(C_6H_5)]^+[CH_3CO_2]^-$. In general, about 0.2 phr accelerator is an effective amount, and preferably about 0.35–1.5 phr is used.

If quaternary ammonium or phosphonium salts of bisphenols are used as curing agents, then addition of a cure accelerator is not necessary.

The polyhydroxy cure system will also contain a metal compound composed of a divalent metal oxide, such as magnesium oxide, zinc oxide, calcium oxide, or lead oxide, or a divalent metal hydroxide; or a mixture of the oxide and/or hydroxide with a metal salt of a weak acid, for example a mixture containing about 1–70 percent by weight of the metal salt. Among the useful metal salts of weak acids are barium, sodium, potassium, lead, and calcium stearates, benzoates, carbonates, oxalates, and phosphites. The amount of the metal compound added is generally about 1–15 phr, about 2–10 parts being preferred.

Diamines and diamine carbamates are also useful curing agents for the compositions of the invention. Examples of useful diamines include N,N'-dicinnamylidene-1,6-hexanediamine, trimethylenediamine, cinnamylidene trimethylenediamine, cinnamylidene ethylenediamine, and cinnamylidene hexamethylenediamine. Examples of useful carbamates are hexamethylenediamine carbamate, bis(4-aminocyclohexyl)methane carbamate, 1,3-diaminopropane monocarbamate, ethylenediamine carbamate and trimethylenediamine carbamate. Usually about 0.1–5 phr of the carbamate is used.

Other additives may be compounded into the fluoroelastomer to optimize various physical properties. Such additives include carbon black, stabilizers, plasticizers, lubricants, pigments, fillers, and processing aids typically utilized in perfluoroelastomer compounding. Any of these additives can be incorporated into the compositions of the present invention, provided the additive has adequate stability for the intended service conditions.

Carbon black is used in elastomers as a means to balance modulus, tensile strength, elongation, hardness, abrasion resistance, conductivity, and processability of the compositions. Carbon black is generally useful in amounts of from 5–60 phr.

In addition, or in the alternative, fluoropolymer fillers may be present in the composition. Generally from 1 to 50 phr of a fluoropolymer filler is used, and preferably at least about 5 phr is present. The fluoropolymer filler can be any finely divided, easily dispersed plastic fluoropolymer that is solid at the highest temperature utilized in fabrication and curing of the perfluoroelastomer composition. By solid, it is meant that the fluoroplastic, if partially crystalline, will have a crystalline melting temperature above the processing temperature(s) of the perfluoroelastomer(s). Such finely divided, easily dispersed fluoroplastics are commonly called micropowders or fluoroadditives. Micropowders are ordinarily partially crystalline polymers.

A preferred additive class includes molecular sieves, particularly zeolites. Molecular sieve zeolites are crystalline aluminosilicates of Group IA and Group IIA elements, such as sodium, potassium, magnesium, and calcium. Chemically, they are represented by the empirical formula: $M_{2/n}O.Al_2O_3.ySiO_2.wH_2O$ where y is 2 or greater, n is the cation valence, and w represents the water contained in the voids of the zeolite. Commercially available examples of such compositions include Molecular Sieve 3A, Molecular Sieve 4A, Molecular Sieve 5A, and Molecular Sieve 13X, all available from Aldrich Chemical Co., Inc. Milwaukee, Wis. Use of this class of additives prevents sponging and improves heat aging of vulcanizates upon press curing in many instances. In general, use of about 1–5 phr is sufficient.

Other preferred additives include modified silane coated mineral fillers. By "modified silane" is meant that the silane contains at least one reactive functional group such as an amino group, or an epoxy group. The mineral fillers used in this invention are preferably somewhat alkaline, such as calcium metasilicates ($CaSiO_3$), especially wollastonite. Wollastonite coated with either an aminosilane or an epoxysilane is especially preferred. These compounds are commercially available from Quartzwerke GmbH of Freschen, Germany as Tremin®283 EST (epoxysilane treated wollastonite) and Tremin®283 AST (aminosilane treated wollastonite). These modified silane coated mineral fillers prevent sponging of the fluoroelastomer composition during press cure and also accelerate the cure rate. Generally, about 5 to 80 phr modified silane coated mineral filler is useful in the compositions of this invention, about 10 to 60 phr being preferred.

Organotin hydrides are another class of additive that may be employed. Tri-n-butyltin hydride (TBTH) is especially preferred. These tin hydride fillers accelerate the cure rate of the compositions of this invention and increase the modulus and improve the compression set resistance of the cured compounds. Generally, about 0.2 to 1.5 phr organotin hydride filler is useful, about 0.4 to 0.8 phr being preferred.

The crosslinking agent, accelerator, metal oxide, and other additives are generally incorporated into the polymer by means of an internal mixer or on a rubber mill. The resultant composition is then cured, generally by means of heat and pressure, for example by compression transfer or injection molding.

The curable compositions of the present invention are useful in production of gaskets, tubing, seals and other molded components. Such articles are generally produced by molding a compounded formulation of the curable composition with various additives under pressure, curing the part, and then subjecting it to a post cure cycle. The cured compositions have excellent low temperature flexibility and processability as well as excellent thermal stability and chemical resistance. They are particularly useful in applications such as seals and gaskets requiring a good combination of oil resistance, fuel resistance and low temperature flexibility, for example in fuel injection systems, fuel line connector systems and in other seals for high and low temperature automotive uses.

The invention is now illustrated by certain embodiments wherein all parts and percentages are by weight unless otherwise specified.

EXAMPLES

Test Methods

Cure Characteristics

Unless otherwise noted, cure characteristics were measured using a Monsanto oscillating disk rheometer (ODR), under conditions corresponding to ASTM D 2084 at 1° arc, 24 minutes, 180° C. The following cure parameters were recorded:

$M_H$: maximum torque level, in units of dN·m $M_L$: minimum torque level, in units of dN·m Delta M: difference between maximum and minimum torque, in units of dN·m $t_s2$: minutes to a 2.26 dNm rise above $M_L$ tc50: minutes to 50% of maximum torque tc90: minutes to 90% of maximum torque Tensile Properties Unless otherwise noted, stress/strain properties were measured on test specimens that had been press cured at 180° C. for 15 minutes and then post cured in a hot air oven for 24 hours at 232° C. The following physical property parameters were recorded; test methods are in parentheses:

$M_{100}$: modulus at 100% elongation in units of MPa (ISO 37)

$T_B$: tensile strength in units of MPa (ISO 37)

$T_S$: tear strength in units of dN/m (ISO 34, Die B)

$E_B$: elongation at break in units of % (ISO 37)

TR-10: temperature of retraction (ISO 2921)

According to the TR test method, a standard test piece of length 50 mm is stretched at room temperature and then cooled in a bath (usually filled with isopropanol) to a temperature of about 10° C. less than the $T_g$ of the polymer. The test piece is then allowed to retract freely while the test temperature is raised at a rate of 1° C. per minute. Readings of the retracted length are taken every 2 minutes until the retraction reaches 75%. TR-10 is the temperature at which a retraction of 10% is achieved.

Hardness (Shore A, ISO 868)

Compression set of small pip samples (ISO 815)

Example 1

A polymer of the invention, Polymer 1A, was prepared by continuous emulsion polymerization, carried out at 120° C. in a well-stirred 2.0 liter stainless steel liquid full reaction vessel. An aqueous solution, consisting of 2.68 g/hour (g/h) ammonium persulfate, 1.4 g/h sodium hydroxide, 3.4 g/h ammonium perfluorooctanoate, and 0.7 g/h isopropanol in deionized water, was fed to the reactor at a rate of 4 L/hour. The reactor was maintained at a liquid-full level at a pressure of 6.2 MPa by means of a back-pressure control valve in the effluent line. After 30 minutes, polymerization was initiated by introduction of a gaseous monomer mixture consisting of 113.1 g/h tetrafluoroethylene (TFE), 614.1 g/h vinylidene fluoride ($VF_2$), and 391.2 g/h perfluoro(methylvinyl) ether (PMVE) fed through a diaphragm compressor. After 15 minutes more, 2-hydropentafluoropropylene (HPFP) was added to the remainder of the gaseous mixture and added at a rate of 32.9 g/h. After 1.5 hours, effluent dispersion was collected for 6 hours. The effluent polymer dispersion, which had a pH of 4.5 and contained 22.0 wt. % solids, was separated from residual monomers in a degassing vessel at atmospheric pressure. Fluoroelastomer product was isolated from the dispersion by reducing the pH to about 3 with dilute nitric acid and coagulating with calcium nitrate solution. The coagulated polymer was allowed to settle, supernatant serum was removed, and the polymer was washed by reslurrying in water twice before filtering. The wet crumb was dried in an air oven at approximately 50°–65° C. to a moisture content of less than 1%. About 6.7 kg of polymer was recovered at an overall conversion of 97%. The product, composed of 10.09 wt. % TFE units, 53.96 wt. % $VF_2$ units, 34.05 wt. % PMVE units and 1.9 wt. % HPFP units, was an amorphous elastomer having a glass transition temperature of −28° C., as determined by differential scanning calorimetry (heating mode, 10° C./minute, inflection point of transition). Inherent viscosity of the elastomer was 0.87 dL/g, measured at 30° C. in methyl ethyl ketone, and Mooney viscosity, ML-10 (121° C.), was 49.

A second polymer of the invention, Polymer 1B, was prepared in substantially the same manner. An aqueous solution, consisting of 2.64 g/h APS, 1.2 g/h sodium hydroxide, and 2.2 g/h ammonium perfluorooctanoate in deionized water, was fed to the reactor at a rate of 4 L/h. After 30 minutes, polymerization was initiated by introducing a gaseous monomer mixture consisting of 113.1 g/h TFE, 614.1 g/h $VF_2$, and 391.2 g/h PMVE fed through a diaphragm compressor. After 15 minutes more, HPFP was added to the remainder of the gaseous mixture and was fed to the reactor at a rate of 32.9 g/h. After 1.5 hours, effluent dispersion was collected for 2.5 hours. The effluent polymer dispersion, having a pH of 4.0 and containing 21.7% solids, was separated from residual monomers. Fluoroelastomer product was isolated from the dispersion by reducing the pH to about 3 with dilute sulfuric acid and coagulating with potassium aluminum sulfate solution. The coagulated polymer was treated as described for Polymer 1A and wet crumb was dried in an air oven at approximately 50–65° C. to a moisture content of less than 1%. About 2.8 kg of polymer was recovered at an overall conversion of 98%. The polymer product, composed of 9.99 wt. % TFE units, 54.12 wt. % $VF_2$ units, 33.85 wt. % PMVE units and 2.04 wt. % HPFP units, was an amorphous elastomer having a glass transition temperature of −29° C., as determined by differential scanning calorimetry (heating mode, 10° C./minute, inflection point of transition). Inherent viscosity of the elastomer was 1.10 dL/g, measured at 30° C. in methyl ethyl ketone, and Mooney viscosity, ML-10 (121° C.), was 89.

A third polymer, Control Polymer A, was prepared generally according to the process disclosed in U.S. Pat. No. 4,214,060. It differed from Polymers 1A and 1B in that the cure site monomer 4-bromo-3,3,4,4-tetrafluorobutene-1 (BTFB) was used in place of HPFP. The copolymer was composed of 55 wt. % $VF_2$ units, 10 wt. % TFE units, 34.8 wt. % PMVE units and 1.2 wt. % BTFB units.

Samples of Polymer 1A, Polymer 1B, and Control Polymer A were compounded on a two-roll rubber mill with the components shown in Table I. Cure characteristics and physical properties of the cured compositions, measured according to the Test Methods described above, are also reported in Table I.

The physical properties of Samples 1A–1D compared favorably to those of the Control polymer, which has desirable physical properties and good low temperature sealing performance. In addition, Samples 1A–1D were much easier to demold than the Control.

TABLE I

| Formulation | Sample 1 | Sample 2 | Sample 3 | Sample 4 | Control |
|---|---|---|---|---|---|
| Polymer 1A | 100 | 100 | | | |
| Polymer 1B | | | 100 | 100 | |

TABLE I-continued

| Formulation | Sample 1 | Sample 2 | Sample 3 | Sample 4 | Control |
|---|---|---|---|---|---|
| Control Polymer A | | | | | 100 |
| MT Carbon Black[1] | 30 | 30 | 30 | 30 | 30 |
| Calcium Oxide VG | 6 | 6 | 6 | 6 | |
| Calcium Hydroxide | | | | | 5 |
| Molecular sieve 13X | 3 | 3 | 3 | 3 | |
| VPA No. 2[2] | 0.5 | 0.5 | 0.5 | 0.5 | 0.5 |
| Luperox 101 XL[3] | | | | | 4 |
| Diak #8[4] | | | | | 2 |
| TBAHS[5] | 0.5 | 0.6 | 0.5 | 0.6 | |
| Bisphenol AF[6] | 2.5 | 3 | 2.5 | 3 | |
| Cure Characteristics | | | | | |
| $M_L$, dNm | 4.32 | 4.09 | 7.14 | 6.92 | 10.26 |
| $M_H$, dNm | 45.6 | 50.75 | 43.86 | 55.54 | 56.84 |
| Delta M, dNm | 41.28 | 46.66 | 36.72 | 48.62 | 46.6 |
| $t_s2$ | 2.72 | 2.77 | 3.22 | 3.37 | 1.8 |
| tc50, minutes | 5.37 | 6.13 | 7.26 | 7.9 | 3.72 |
| tc90, minutes | 12.49 | 11.8 | 18.04 | 16.15 | 7.16 |
| Stress Strain Properties | | | | | |
| $T_B$, MPa | 12.8 | 12.4 | 15.1 | 15.3 | 20.1 |
| $E_B$, % | 254 | 219 | 244 | 230 | 212 |
| $M_{100}$, MPa | 4.5 | 4.7 | 5 | 5.3 | 6.1 |
| TS, kN/m | 22.5 | 22.4 | 20.1 | 21.8 | 20.9 |
| Hardness (Shore A) | 71.5 | 73.1 | 70.7 | 72.3 | 68.7 |
| TR-10, °C. | −26 | | −26 | | −28 |
| Compression Set @200° C., 70 hours, % | 37.5 | 38.8 | 32 | 35 | 26.2 |

[1]Thermax FF N 990 medium thermal carbon black (available from Lehmann & Voss Co.)
[2]Rice Bran Wax (available from DuPont Dow Elastomers L.L.C.)
[3]2,5-Dimethyl-2,5-di(t-butylperoxy)hexane 45% Active (available from Atochem)
[4]Trimethylallylisocyanurate (available from DuPont Dow Elastomers L.L.C.)
[5]Tetrabutylammonium hydrogen sulfate (available from DuPont Dow Elastomers L.L.C.)
[6]4,4'(Hexafluoroisopropylidene)diphenol (available from DuPont Dow Elastomers L.L.C.)

Example 2

Polymer 2, a polymer of the invention, was prepared by continuous emulsion polymerization carried out at 110° C. in a well-stirred 4.0 liter stainless steel reaction vessel, substantially according to the procedure described for preparation of Polymer 1A. An aqueous solution consisting of 6.47 g/h ammonium persulfate, 3.6 g/h sodium hydroxide, and 5.5 g/h ammnonium perfluorooctanoate, in deionized water was fed to the reactor at a rate of 8 L/h. After 30 minutes, the reaction was initiated by introducing a gaseous monomer mixture consisting of 524.0 g/h TFE, 748.9 g/h VF$_2$, 888.9 g/h PMVE, and 60.4 g/h HPFP fed through a diaphragm compressor. After 2 hours, effluent dispersion was collected for 4 hours. The effluent polymer dispersion, having a pH of 4.5 and containing 20.9 wt. % solids was separated from residual monomers. Fluoroelastomer was isolated from the dispersion by reducing pH to about 3 with dilute sulfuric acid and coagulating with potassium aluminum sulfate solution. The coagulated polymer was collected as described in Example 1. The wet crumb was dried in an air oven at approximately 50–65° C. to a moisture content of less than 1%. About 8.4 kg of polymer was recovered at an overall conversion of 95%. The polymer, composed of 24.51 wt. % TFE units, 35.14 wt. % VF$_2$ units, 39.20 wt. % PMVE units and 1.15 wt. % HPFP units, was an amorphous elastomer having a glass transition of −24° C. as determined by differential scanning calorimetry (heating mode, 10° C./min, inflection point of transition). Inherent viscosity of the fluoroelastomer was 0.71 dL/g, measured at 30° C. in methyl ethyl ketone, and Mooney viscosity, ML-10 (121° C.), was 104.

Control Polymer B was prepared in substantially the same manner as Polymer 1A. An aqueous solution, consisting of 2.77 g/h ammonium persulfate, 0.80 g/h sodium hydroxide, and 2.25 g/h ammonium perfluorooctanoate, in deionized water, was fed to the reactor at a rate of 4 L/h. After 30 minutes, the reaction was initiated by introducing a gaseous monomer mixture consisting of 320.6 g/h TFE, 389.5 g/h VF$_2$, and 477.4 g/h PMVE. After 1.5 hours, effluent dispersion was collected for 7 hours. The effluent polymer dispersion, when separated from residual monomers had a pH of 3.2 and contained 22.6 weight percent solids. The fluoroelastomer was isolated by coagulation as described for Polymer 1A. The wet crumb was dried in an air oven at approximately 50–65° C. to a moisture content of less than 1%. About 7.9 kg of polymer was recovered at an overall conversion of 98%. The polymer, composed of 27.29 wt % TFE units, 33.30 wt. % VF$_2$ units, and 39.41 wt. % PMVE. units had an inherent viscosity was 0.88 dL/g, measured at 30° C. in methyl ethyl ketone, and Mooney viscosity, ML-10 (121° C.) of 100.

Samples of Polymer 2 and Control Polymer B were compounded with the components shown in Table II. Cure characteristics were measured by ODR. Control B, which contained no copolymerized HPFP, exhibited essentially no cure response.

TABLE II

| Formulation (parts by weight) | Sample 2 | Control Sample B |
|---|---|---|
| Polymer 2 | 100 | 0 |
| Control Polymer B | 0 | 100 |
| MT Carbon Black[1] | 10 | 10 |
| TBAHS[2] | 1 | 1 |

TABLE II-continued

| Formulation (parts by weight) | Sample 2 | Control Sample B |
|---|---|---|
| Bisphenol AF[3] | 2 | 2 |
| MgO | 2 | 2 |
| Ca(OH)$_2$ | 2 | 2 |
| Cure Characteristics | | |
| M$_H$, dNm | 49.7 | — |
| delta M, dN.m | 39.5 | 0.6 |
| t$_s$2, minutes | 2.7 | — |
| tc90, minutes | 9.7 | — |

[1]Thermax FF N 990 medium thermal carbon black (available from Lehmann & Voss Co.)
[2]Tetrabutylammonium hydrogen sulfate (available from DuPont Dow Elastomers L.L.C.)
[3]4,4'(Hexafluoroisopropylidene)diphenol (available from DuPont Dow Elastomers L.L.C.)

Example 3

Polymer 3, a polymer of the invention, was prepared by semi-batch emulsion polymerization carried out at 80° C. in a well-stirred reaction vessel. A 33 liter, horizontally agitated reactor was charged with 24.0 liters of deionized, deoxygenated water and 55.0 g ammonium perfluorooctanoate. The reactor was heated to 80° C. and then pressurized to 1.5 MPa with a mixture of 10.0 wt. % TFE, 20.0 wt. % VF$_2$, 35.0 wt. % PMVE, and 35 wt. % HPFP. A 40.0 ml sample of a 1% ammonium persulfate/3% disodium hydrogen phosphate initiator solution was then added. A mixture of 55.0 wt. % VF$_2$, 33.0 wt. % PMVE, 10.0 wt. % TFE, and 2.0 wt. % HPFP was supplied to the reactor to maintain a pressure of 1.5 MPa throughout the polymerization. After 300 g of monomer mixture had been supplied to the reactor, 13.6 ml of 1,4 diiodoperfluorobutane was fed to the reactor over one hour. After the diiodo addition was complete, initiator was added at a rate sufficient to maintain 500 g/hour monomer consumption. After a total of 8172 g monomer mixture was supplied to the reactor, requiring 121 ml initiator solution, monomer addition was discontinued and the reactor purged of residual monomer. The resulting emulsion was coagulated by addition of sulfuric acid and potassium alum, and washed with deionized water. The polymer crumb was dried for two days at 60° C. Polymer 3, composed of 52.79 wt. % VF$_2$ units, 14.80 wt. % TFE units, 30.57 wt. % PMVE units, 1.67 wt. % HPFP units and 0.17 wt. % I, had a Mooney viscosity, ML-10 (121° C.), of 51. A sample of Polymer 3 was compounded with the components shown in Table III. Curing characteristics and physical properties of the cured composition were measured according to the Test Methods, except an Alpha Technologies MDR was used to measure cure characteristics at a temperature of 180° C. and rotor amplitude of 0.5°, and physical properties were measured on slabs of this composition which had been press cured at 170° C. for 4 minutes and then post-cured in an air oven at 230° C. for 24 hours. Results are reported in Table III.

TABLE III

| Formulation (phr) | Sample 3 |
|---|---|
| Polymer 3 | 100 |
| Tremin ® 283 600 EST[1] | 45.0 |
| MT Carbon Black[2] | 2.5 |
| Calcium Oxide | 6.0 |
| Elastomag ® 170[3] | 1.0 |
| Molecular sieve 13x | 3.0 |
| Bisphenol AF[4] | 2.0 |
| TBAHS[5] | 0.5 |
| VPA No. 2[6] | 1.0 |
| Cure Characteristics | |
| M$_L$, dNm | 2.35 |
| M$_H$, dNm | 26.47 |
| t$_s$2, minutes | 0.33 |
| tc90, minutes | 1.81 |
| Stress Strain Properties | |
| T$_B$, MPa | 12.9 |
| E$_B$, % | 157 |
| M$_{100}$, MPa | 9.6 |
| Hardness (Shore A) | 77.1 |
| Compression Set @200° C., 70 hours, % | 36.4 |

[1]Calcium meta-silicate treated with aminosilane (available from Quartzwerke GmbH Freschen, Germany)
[2]Thermax FF N 990 medium thermal carbon black (available from Lehmann & Voss Co.)
[3]Magnesium oxide (available from Morton Performance Chemicals, Inc.).
[4]4,4'(Hexafluoroisopropylidene)diphenol (available from DuPont Dow Elastomers L.L.C.)
[5]Tetrabutylammonium hydrogen sulfate (available from DuPont Dow Elastomers L.L.C.)
[6]Rice Bran Wax (available from DuPont Dow Elastomers L.L.C.)

Example 4

Polymer 4, a polymer of the invention, was prepared by continuous emulsion polymerization in a well-stirred stainless steel liquid full reaction vessel. The reactor was heated to 125° C. and the aqueous solution was fed at 4 L/h. The aqueous feed consisted of 1.58 g/h ammonium persulfate (APS), 1.2 g/h sodium hydroxide, and 2.2 g/h ammonium perfluorooctanoate (FC-143) and 0.47 g/h isopropanol in deionized water. The reactor was kept liquid-full at 6.2 MPa by means of a back-pressure control valve in the effluent line. After 30 minutes, the reaction was started by introducing a gaseous monomer mixture consisting of 88.2 g/h tetrafluoroethylene (TFE), 614.1 g/h vinylidene fluoride (VF$_2$), and 413.8 g/h perfluoromethylvinyl ether (PMVE) fed through a diaphragm compressor. After 15 minutes, another gaseous monomer was added to the rest of the gaseous mixture, 35.2 g/h 2-hydropentafluoro-propylene (HPFP). After 1.5 hours, effluent dispersion was collected for 5 hours.

The effluent polymer dispersion was separated from residual monomers in a degassing vessel at atmospheric pressure. The dispersion had a pH of 4.6 and contained 21.4 weight percent solids. The fluoroelastomer was isolated from the dispersion by reducing pH to about 3 with dilute sulfuric acid and coagulating with potassium aluminum sulfate solution. The coagulated polymer was allowed to settle, supernatant serum was removed, and the polymer was washed by reslurrying in the water twice before filtering. The wet crumb was dried in an air oven at approximately 50°–65° C. to a moisture content of less than 1%.

Polymer product was recovered at an overall conversion of 97%. The polymer had the composition of 7.8 wt. % TFE, 54.29 wt. % VF$_2$, 35.98 wt. % PMVE and 1.93 wt. % HPFP. The polymer was an amorphous elastomer with a glass transition of −29° C. as determined by differential scanning calorimetry (heating mode, 10° C./minute, inflection point of transition). Fluoroelastomer inherent viscosity was 1.14 dL/g, measured at 30° C. in methyl ethyl ketone, and Mooney viscosity was measured as ML-10 (121° C.)=82.

Polymer 4 was compounded on a two-roll rubber mill with the additives shown in Table IV. Curing characteristics, measured in accordance with the Test Methods (except 1° arc, 180° C., 12 minutes), are also shown in Table IV. Sample 4A, containing tri-n-butyltin hydride, exhibited a much faster cure rate (70.5 dNm/minute) than Sample 4B, which did not contain tin hydride.

TABLE IV

| Formulation (phr) | Sample 4A | Sample 4B |
|---|---|---|
| Polymer 4 | 100 | 100 |
| MT Carbon Black[1] | 30 | 30 |
| Elastomag 170[2] | 3 | 3 |
| Calcium Oxide VG | 6 | 6 |
| Molecular sieve 13x | 3 | 3 |
| VC50[3] | 2.5 | 2.5 |
| VPA No. 2[4] | 1.0 | 0 |
| Tri-n-butyltin hydride | 0 | 1.0 |
| Cure Characteristics | | |
| $M_L$, dNm | 11.5 | 12.2 |
| $M_H$, dNm | 54.6 | 55.7 |
| Delta M, dNm | 43.1 | 43.5 |
| $t_s2$, minutes | 1.56 | 1.10 |
| tc50, minutes | 2.51 | 1.58 |
| tc90, minutes | 3.87 | 2.39 |
| Peak Rate, dNm/minute | 39 | 70.5 |

[1]Thermax FF N 990 medium thermal carbon black (available from Lehmann & Voss Co.)
[2]Magnesium oxide (available from Morton Performance Chemicals, Inc.).
[3]An 80 wt. %/20 wt. % salt of bisphenol AF reacted with benzyltriphenylphosphonium chloride (available from DuPont Dow Elastomers L.L.C.)
[4]Rice Bran Wax (available from DuPont Dow Elastomers L.L.C.)

Example 5

Polymer 5, a polymer of the invention, was prepared by emulsion polymerization. A continuous emulsion polymerization was carried out in a well-stirred stainless steel liquid full reaction vessel. The reactor was heated to 110° C. and the aqueous solution was fed at 3 L/h. The aqueous feed consisted of 1.27 g/hour (g/h) ammonium persulfate (APS), 0.91 g/h sodium hydroxide, 1.7 g/h ammonium perfluorooctanoate (FC-143), and 0.35 g/h isopropanol in deionized water. The reactor was kept liquid-full at 6.2 MPa by means of a back-pressure control valve in the effluent line. After 30 minutes, the reaction was started by introducing a gaseous monomer mixture consisting of 61.2 g/h tetrafluoroethylene (TFE), 462.4 g/h vinylidene fluoride ($VF_2$), and 321.7 g/h perfluoro(methylvinyl) ether (PMVE) fed through a diaphragm compressor. After 15 minutes, another gaseous monomer was added to the rest of the gaseous mixture, 27.0 g/h 2-hydropentafluoropropylene (HPFP). After 1.5 hours, effluent dispersion was collected for 6 hours.

The effluent polymer dispersion was separated from residual monomers in a degassing vessel at atmospheric pressure. The dispersion had a pH of 5.8 and contained 21.4 weight percent solids. The fluoroelastomer was isolated from the dispersion by reducing pH to about 3 with dilute nitric acid and coagulating with calcium nitrate solution. The coagulated polymer was allowed to settle, supernatant serum was removed, and the polymer was washed by reslurrying in the water twice before filtering. The wet crumb was dried in an air oven at approximately 50°–65° C. to a moisture content of less than 1%.

Polymer product was recovered at an overall conversion of 97%. The polymer had a copolymerized monomer composition of 7.16 wt. % TFE, 54.06 wt. % $VF_2$, 36.85 wt. % PMVE and 1.9 wt. % HPFP. The polymer was an amorphous elastomer with a glass transition temperature of −28° C. as determined by differential scanning calorimetry (heating mode, 10° C./minute, inflection point of transition). Fluoroelastomer inherent viscosity was 1.22 dL/g, measured at 30° C. in methyl ethyl ketone, and Mooney viscosity was measured as ML-10 (121° C.)=98.

Polymer 5 was compounded on a two-roll rubber mill with the additives shown in Table V. Curing characteristics and physical properties of the cured compositions were measured according to the Test Methods and are also reported in Table V.

TABLE V

| Formulation, phr | 5A | 5B | 5C | 5D | 5E | 5F | 5G |
|---|---|---|---|---|---|---|---|
| Polymer 5 | 100 | 100 | 100 | 100 | 100 | 100 | 100 |
| MT Carbon Black[1] | 2.5 | 2.5 | 2.5 | 2.5 | 2.5 | 2.5 | 2.5 |
| Tremin ® 283 400 EST[2] | 45 | 0 | 0 | 0 | 0 | 0 | 0 |
| Tremin ® 283 600 EST[3] | 0 | 45 | 0 | 0 | 0 | 0 | 0 |
| Tremin ® 283 600 AST[4] | 0 | 0 | 45 | 0 | 0 | 0 | 0 |
| Tremin ® 283 EST 800M[5] | 0 | 0 | 0 | 45 | 0 | 0 | 0 |
| Tremin ® 283 800 TST[6] | 0 | 0 | 0 | 0 | 45 | 0 | 0 |
| Nyad ® 400[7] | 0 | 0 | 0 | 0 | 0 | 45 | 0 |
| Blanc Fixe Micro[8] | 0 | 0 | 0 | 0 | 0 | 0 | 70 |
| Calcium Oxide VG | 6 | 6 | 6 | 6 | 6 | 6 | 6 |
| Elastomag ® 170[9] | 1 | 1 | 1 | 1 | 1 | 1 | 1 |
| Molecular sieves 13x | 3 | 3 | 3 | 3 | 3 | 3 | 3 |
| Bisphenol AF[10] | 2 | 2 | 2 | 2 | 2 | 2 | 2 |
| TBAHS[11] | 0.5 | 0.5 | 0.5 | 0.5 | 0.5 | 0.5 | 0.5 |
| VPA No. 2[12] | 1 | 1 | 1 | 1 | 1 | 1 | 1 |
| Cure Characteristics | | | | | | | |
| $M_L$, dNm | 3.26 | 3.07 | 3.47 | 3.65 | 3.71 | 2.64 | 3.06 |
| $M_H$, dNm | 22.9 | 24.5 | 23.6 | 24.4 | 24.6 | 21.1 | 22.1 |
| Delta M, dNm | 19.6 | 21.4 | 20.1 | 20.7 | 20.9 | 18.5 | 19.0 |
| $t_s2$, minutes | 0.55 | 0.48 | 0.58 | 0.53 | 0.48 | 0.94 | 1.17 |
| tc50, minutes | 0.79 | 0.66 | 0.8 | 0.72 | 0.65 | 1.44 | 2.45 |
| tc90, minutes | 1.95 | 2.01 | 2.2 | 2.38 | 2.79 | 2.75 | 7.55 |
| Peak rate, dNm/minute | 42.7 | 58.9 | 45.9 | 54.7 | 58.4 | 22.5 | 6.8 |

TABLE V-continued

| Formulation, phr | 5A | 5B | 5C | 5D | 5E | 5F | 5G |
|---|---|---|---|---|---|---|---|
| Stress Strain Properties | | | | | | | |
| $T_B$, MPa | 12.6 | 14.1 | 14.2 | 15.6 | | 10.1 | 11.4 |
| $E_B$, % | 177.6 | 178 | 173 | 169 | | 196 | 210 |
| $M_{100}$, MPa | 8.7 | 8.8 | 9.4 | 9.7 | | 7.3 | 5.8 |
| Hardness (Shore A) | 73.7 | 73.9 | 74.1 | 74.9 | | 72.1 | 73.9 |
| Compression Set | | | | | | | |
| @200° C., 70 hours, % | 32.7 | 30.1 | 30.7 | 30.4 | | 38.9 | 36.9 |
| Sponging | No | No | No | No | Yes | No | No |

[1]Thermax FF N 990 medium thermal carbon black (available from Lehmann & Voss Co.)
[2]Epoxysilane coated wollastonite
[3]Epoxysilane coated wollastonite
[4]Aminosilane coated wollastonite
[5]Epoxysilane coated wollastonite
[6]Methylsilane coated wollastonite
[7]Non-coated wollastonite
[8]Precipitated $BaSO_4$
[9]Magnesium oxide (available from Morton Performance Chemicals, Inc.).
[10]4,4'(Hexafluoroisopropylidene)diphenol (available from DuPont Dow Elastomers L.L.C.)
[11]Tetrabutylammonium hydrogen sulfate (available from DuPont Dow Elastomers L.L.C.)
[12]Rice Bran Wax (available from DuPont Dow Elastomers L.L.C.)

What is claimed is:

1. A fluoroelastomer consisting essentially of copolymerized units of 23–65 weight percent vinylidene fluoride, 25–75 weight percent perfluoro(alkyl vinyl) ether, 0–30 weight percent tetrafluoroethylene, 0.3–5 weight percent 2-hydropentafluoropropene.

2. A fluoroelastomer of claim 1 having up to about 1 wt. % iodine chemically bound to the fluoroelastomer chain ends.

3. A fluoroelastomer of claim 2 having between 0.1–0.3 weight percent iodine chemically bound to the fluoroelastomer chain ends.

4. A fluoroelastomer of claim 1 wherein said perfluoro (alkyl vinyl) ether is perfluoro (methyl vinyl) ether.

5. A fluoroelastomer of claim 4 wherein copolymerized units of said perfluoro (methy vinyl) ether are present in an amount between 30 and 44 weight percent.

6. A fluoroelastomer of claim 1 wherein said copolymerized units of 2-hydropentafluoropropene are present in an amount between 0.7 and 3.0 weight percent.

7. A fluoroelastomer of claim 1 wherein said copolymerized units of tetrafluoroethylene are present in an amount between 3 and 30 weight percent.

* * * * *